Figure 1:
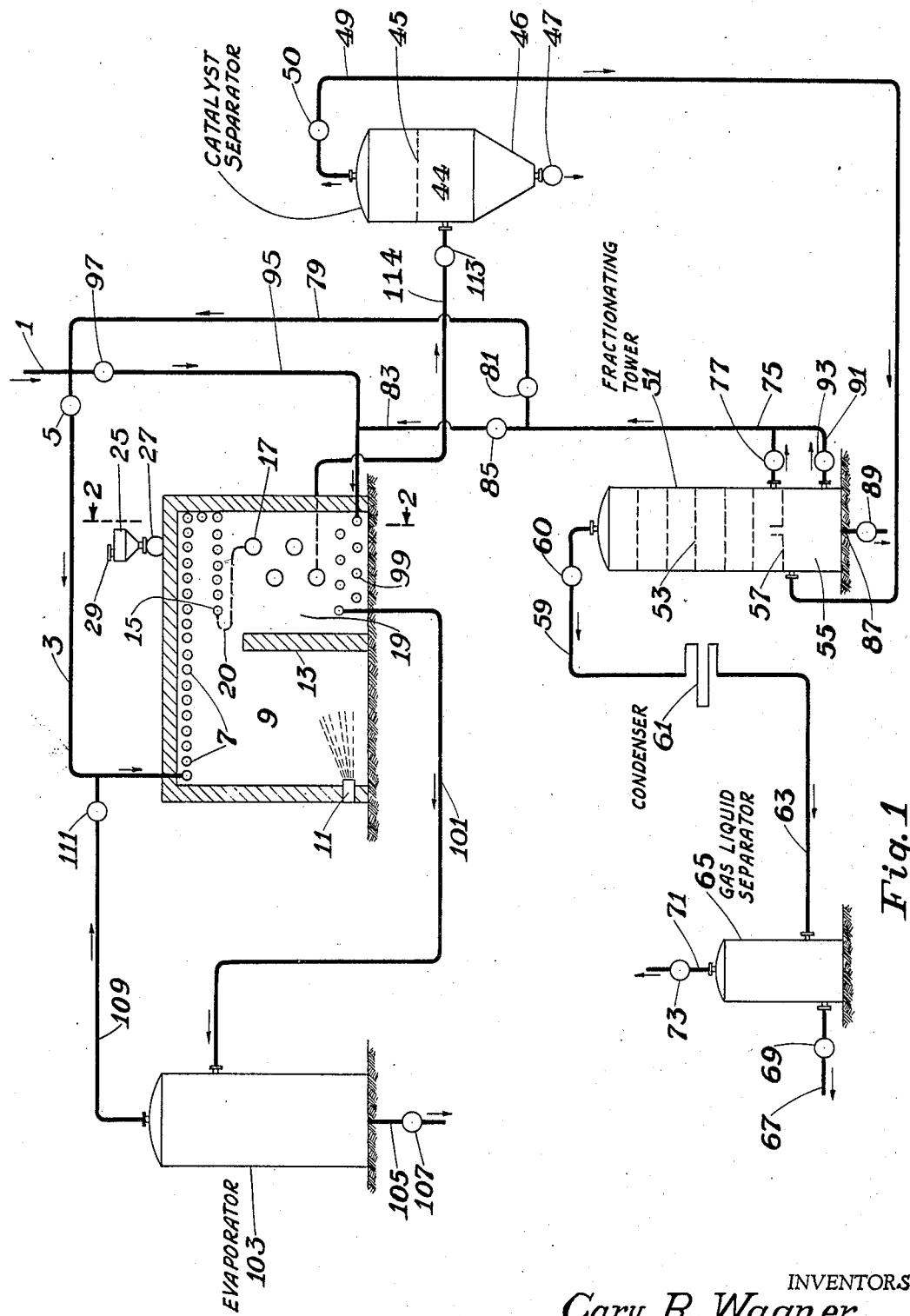

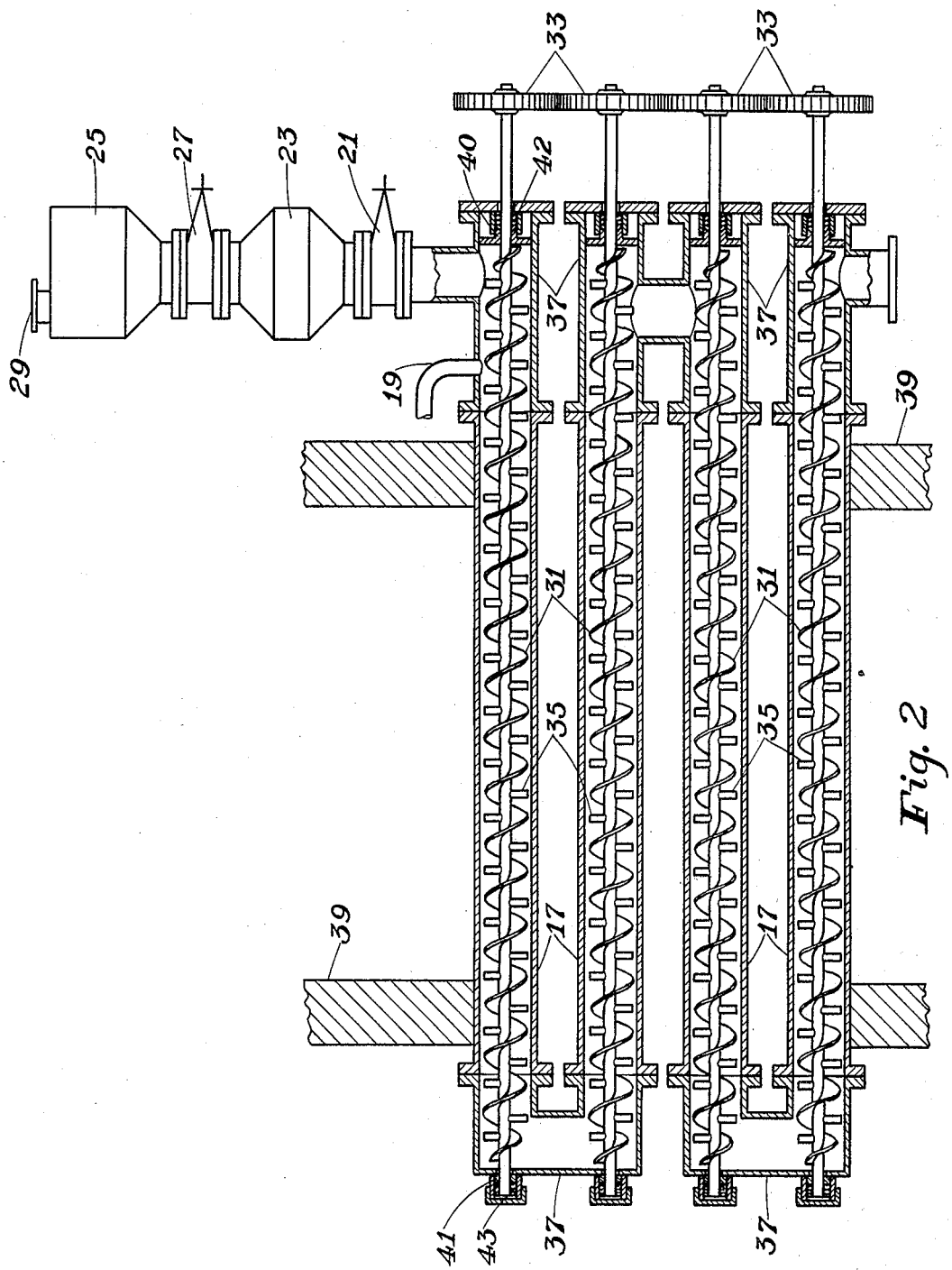

Patented May 30, 1944

2,350,204

UNITED STATES PATENT OFFICE 2,350,204

CATALYTIC CONVERSION OF HYDROCARBONS

Cary R. Wagner, Chicago, and Charles M. Ridgway, Highland Park, Ill., assignors to The Pure Oil Company, Chicago, Ill., a corporation of Ohio Application March 18, 1939, Serial No. 262,598

1 Claim. (Cl. 196—52)

This invention relates to the conversion of hydrocarbon fluids and is particularly concerned with methods and apparatus for catalytically converting hydrocarbon oils into gasoline boiling hydrocarbons of high octane rating.

Various processes are known for converting hydrocarbons into gasoline both in the presence and in the absence of catalysts. In some processes a stationary bed of catalyst is used and the fluid to be converted is passed through the bed in either gaseous or liquid state. Such processes have several disadvantages. The life of the catalyst is relatively short and the catalyst must be regenerated at frequent intervals thereby interrupting the process. Expensive equipment is necessary to regenerate the catalyst in situ and expansive equipment is necessary in order to provide proper contact of fluid and catalyst. Furthermore, it is usually necessary to specially prepare the catalyst so that it will be in a physical state to permit proper passage of fluid through a bed thereof.

Processes are also known in which the catalyst is passed in a stream with the fluid to be converted, through a heating and converting coil or chamber. The use of enlarged chambers is not satisfactory because of the difficulty of heat distribution. Another difficulty in the use of chambers is in the regulation of the time in which the catalyst remains in the reaction zone. In some cases, as in the United States Patent No. 1,799,858, it is necessary to use a catalyst of such fineness that the removal thereof from the vapors creates a serious problem and the velocity of the vapor and catalyst must be so great in order to hold the catalyst in suspension, that the apparatus is eroded by the catalyst.

The passage of solid catalyst in stream with vapor through heating and reaction tubes is not practical in accordance with present known methods. If the catalyst is to be maintained in suspension in the vapor or gas stream, the velocity of the stream must be so high that the catalyst acts similarly to a sand blast, eroding and eating through the walls of the tubes and particularly the return bends. If the vapor velocity is not sufficiently high, the catalyst deposits in the tubes, causing the tubes to become overheated and burn out.

An object of this invention is to devise a practical catalytic method and apparatus for continuously converting hydrocarbons into gasoline boiling material.

A further object of the invention is to provide a method and apparatus for positively and continuously conveying a slowly moving stream of solid catalyst through a reaction zone and for removing catalytic material from the reaction zone after a predetermined period of residence therein, without interrupting the process.

Another object of the invention is to provide a process and apparatus for catalytic conversion of hydrocarbons in which an inexpensive catalyst can be used.

Other objects of the invention will become apparent from the following description considered in conjunction with the accompanying drawings of which Figure 1 is a diagrammatic elevational side view of apparatus for carrying out the invention; and Figure 2 is an enlarged fragmentary sectional, elevational end view of the furnace taken along the lines 2—2 showing the construction of the reaction tubes.

Referring to the drawings, the numeral 1 indicates a line through which fresh charging stock is introduced into the system. Although the invention is applicable to the processing of both oil and gas, the operation will be described in connection with the conversion of hydrocarbon oil. The charging stock may be naphtha, gas oil, crude or topped crude. If a charging stock which is normally gaseous or which is substantially entirely vaporizable is used, it will be charged from the line 1 through line 3 controlled by valve 5 into a bank of heating tubes 7 located in the upper portion of the furnace 9 adjacent the roof and side walls thereof. The heating coils 7 are connected in series and are adapted to be heated chiefly by radiant heat. The furnace 9 is provided with one or more burners 11 and bridge wall 13.

In the coil 7 the vapor or gas is heated to a temperature of approximately 800 to 1000° F. If liquid oil is charged to the heating coil, the oil will be substantially vaporized in its passage through the coil. From the last tube 15 in the series of coils 7 the vapors or gas issue at the aforesaid temperature into a series coil 17 located in the convection zone 19 of the furnace 9. The tubes in coil 17 are preferably of greater cross-sectional area than the tubes in coil 7. Whereas the tubes in coil 7 may have an internal diameter of approximately 4 inches, the tubes in coil 17 may have an internal diameter of from 8 to 10 inches.

The vapors or gases which have been heated by radiant heat to the desired cracking temperature enter the bank of tubes in the coil 17 through the connection 20 and pass serially therethrough, together with catalyst introduced into the uppermost tube of the series through the valve 21. The valve 21 connects the uppermost tube to a hopper 23 which contains a suitable cracking catalyst such as bauxite, natural or acid treated fuller's earth or other clay, artificially prepared alumina, the rare earth oxides, metals such as iron, nickel, cobalt and manganese or the oxides thereof, or any mixture of the aforementioned catalysts. Where the system is used for the dehydrogenation of gas or for polymerization of gas, appropriate catalysts will be used to promote the desired reaction. The hopper 23 is connected to a second hopper 25 by means of a valve 27. The hopper 25 has a closed port 29 through which the hopper may be filled with catalyst. By providing a double hopper of the nature shown, it is possible to run the apparatus continuously since the upper hopper 25 can be filled while the valve 27 is closed and by closing the inlet to the hopper 25 the valve 27 may be opened to allow the catalyst to run from hopper 25 into hopper 23 from which the catalyst flows into the upper tube of the coil 17 in regulated quantities by proper adjustment of the valve 21.

As shown in Figure 2, the coils 17 are provided with screw conveyors 31 which are adapted to convey the catalyst in series through the coil. The screw conveyors are preferably geared together by means of the gears 33 so that they may all be operated from a single source of power. The screw conveyors are preferably equipped with blades or paddles 35 which are adapted to agitate the catalyst as it is conveyed from one end of the tube to the other. In this manner the catalyst may be conveyed through the soaking or reaction coil at a velocity considerably below that of the gas or vapor undergoing conversion.

As shown in Figure 2, the tubes in the coils 17 are connected in series by suitable headers 37 which are adapted to be bolted or riveted to the ends of the tubes. The ends of the tubes preferably extend outside the side walls 39 of the furnace 9 in order to permit the T heads to be easily removed and replaced when necessary.

The headers are provided with suitable bearing surfaces 40 and 41 and packing glands 42 and 43 to permit the shafts of the screw conveyors to be rotatably supported at both ends and to prevent leakage of gas or vapors.

As shown in Figure 1, the tubes are preferably arranged a sufficient distance below each other to permit the catalyst to flow through the headers from one tube to the next lower tube by gravity.

The valve 21 is so adjusted that the quantity of catalyst which is permitted to flow into the uppermost tube of the coils 17 is sufficient to loosely fill the tubes in the coil as the catalyst is conveyed from the uppermost to the lowermost tube in the series. The size of the catalyst particles used may vary provided it is not of such fineness as to pack in the tube and substantially prevent the flow of vapors therethrough.

The rate at which the catalyst is conveyed through the coils 17 is dependent on the speed at which the screw conveyor is run. The speed of the conveyor is adjusted so that it requires approximately 15 minutes to one hour for catalyst to reach from one end of the coil to the other. This time will vary in accordance with the efficiency of the catalyst. The active life of any catalyst can be empirically determined and the speed of the conveyor can then be adjusted so that the catalyst will remain in the conversion zone for the determined period of time.

The coil 17 is heated chiefly by convection heat and the temperature of the furnace gases contacting the coil 17 is such as to only substantially maintain the conversion temperature to which the gas vapors are heated in the coil 17. Whereas the temperature of the furnace gases in the vicinity of the coil 7 may be approximately 1500 to 1600° F., the temperature of the furnace gases contacting the coil 17 will be approximately 1100 to 1300° F.

The length of the coil 17 is sufficient to give the necessary time of residence of the vapor or gas in the convection zone. This period may range from approximately 1 to 10 minutes, depending on the nature of the stock being subjected to conversion and the nature of the catalyst used.

From the lowermost tube in the coil 17 the vapors and catalyst are conducted into a catalyst separator 44 which may take any suitable form. As shown in the drawing, it merely consists of an enlarged chamber provided in the upper portion thereof with a screen 45 of sufficiently fine mesh to substantially prevent particles of catalysts from passing therethrough, and a sloping bottom 46 to permit the catalyst to be removed by gravity therefrom through the valve 47. The catalyst which is removed from the catalytic chamber is then subjected to regeneration in a separate regenerative apparatus and returned to the hopper 25 for further use. Methods of regenerating catalysts are well known in the art and need not be specifically set forth here. The patent to Miller No. 1,799,858 discloses one method of regenerating spent cracking catalysts.

The vapors leave the top of the catalyst separator through the line 49 controlled by valve 50 and pass into the lower part of a fractionating tower 51 equipped with conventional bubble plates 53. Any material boiling above the gasoline range drops out in the bottom part 55 of the tower 51 or is condensed therein and collected on plate 57. The gasoline boiling hydrocarbons are taken overhead through the line 59 controlled by valve 60 through condensing coil 61 in line 63 and collected in the gas liquid separator 65 from which the gasoline boiling hydrocarbons are withdrawn through line 67 controlled by valve 69 and gases may be withdrawn through line 71 controlled by valve 73. The condensate from the plate 57 is recycled through the line 75 controlled by valve 77 to either line 79 controlled by valve 81, or line 83 controlled by valve 85. The material collected in the bottom portion 55 of the tower 51 may either be withdrawn from the system through the line 87 controlled by valve 89 or may be withdrawn though line 91 controlled by valve 93 and recycled together with the condensate withdrawn through line 75.

It may be desirable to vaporize the fresh charging stock prior to charging the same into the heating coil 7, particularly when the charged material contains high boiling material, as for example, in the case of crude or topped crude. In such cases instead of charging the oil through the line 3, the oil is charged through the line 95 controlled by valve 97 into the preheating coil 99 located in the lower portion of the convection zone of furnace 9 wherein the oil may be heated to a temperature of approximately 700 to 800° F. The heated oil leaves the preheating coil 99 through the line 101 and enters evaporator 103 wherein vapors separate from the unvaporized material. The unvaporized material may be withdrawn from the evaporator through line 105 controlled by valve 107 and the vapors are withdrawn from the evaporator through line 109 controlled by valve 111. It will of course be apparent that the valves 5, 97 and 111 will be properly manipulated in accordance with the direction in which the charging oil is passed into the system.

Where the charging stock is first vaporized before passing into heating coil 7, the recycle is passed through line 83 into line 95. In such case valve 81 and line 79 will be closed. Where the fresh charging stock is charged directly to the coil 7 without prior vaporization, the recycle may be charged to the line 79 controlled by valve 81 and in such case the valve 85 and line 83 will be closed. It will of course be understood that even in those cases where the fresh charging stock is charged directly to the coil 7, it may be desirable to charge the recycle through the heating coil 99 into the evaporator 103 in order to eliminate any heavy ends.

The cracking system may be operated at pressures varying from atmospheric to 200 pounds per square inch or more. When the system is used for conversion of gas, pressures of from atmospheric to 2000 pounds per square inch may be used. The pressure on the system may be maintained up to the separator 66 or may be released wholly or partially at the valves 113, 50 or 60. By releasing the pressure at least partially at the valve 113 in line 114, a substantially dry catalyst may be separated in catalyst separator 44. If desired, the valve 113 may be omitted. It may also be necessary to provide a conveyor in line 114 to force the catalyst through the line to the catalyst separator.

By operating in accordance with our invention it is possible to rapidly heat the charging material to the desired conversion temperature in tubes 7 without overheating thereof since it is possible to pass the gas or vapors through the tubes at high velocities. This can be done without deterioration of the tubes because of the absence of catalyst. By injecting the catalyst into the cracking or soaking section where the temperature of the furnace gas is relatively low, the danger in overheating of the tubes is eliminated since the heat input is only sufficient to maintain the vapors or gas at conversion temperature.

By providing enlarged tubes in the soaking or reaction section the velocity of the vapors is decreased below the point where catalyst is carried in suspension and erosion of the tubes and returns bends is substantially eliminated. The provision of a positive means for conveying the catalyst through the soaking coils insures control of the time of residence of the catalyst in the conversion zone so that it remains therein only for the efficient life of the catalyst. The vapors or gas and catalyst are in intimate contact with each other for the fixed period of time so that the extent of cracking can be carefully controlled.

Where catalyst of sufficient size is used so that it cannot be carried in suspension in the vapor or gas stream at high velocity, the tubes in both coils 7 and 17 may be of the same diameter.

Although as shown and described, the vapor passes through the reaction coils in concurrent direction with the catalyst, the vapors may pass in countercurrent direction merely by causing the vapors from the last tube 15 in the coil 7 to enter the lowermost tube in the coil 17 and leave from the uppermost tube.

We claim:

A method for converting hydrocarbon oil to gasoline boiling hydrocarbons comprising rapidly heating oil vapors in a restricted stream in the absence of a catalyst by means of high temperature gases to approximately the desired cracking temperature, passing the heated vapors to a catalytic cracking zone substantially completely filled with solid, comminuted catalyst, passing the vapors in a restricted stream through said catalytic cracking zone at a lower velocity than the velocity in the heating zone, mechanically moving the catalyst through said catalytic cracking zone from inlet to outlet in a horizontal direction, and continuously agitating the catalyst therein, maintaining the catalytic cracking zone at cracking temperature by means of combustion gases having a lower temperature than the gases used to heat the vapor stream in the absence of catalyst but above the temperature in the catalyst zone, and regulating the speed of movement of the catalyst through said catalytic cracking zone, so that its time of residence therein does not substantially exceed its efficient life.

CARY R. WAGNER.
CHARLES M. RIDGWAY.